Dec. 21, 1965    W. G. WORCESTER    3,225,269
ELECTRICAL APPARATUS

Original Filed Jan. 3, 1955

*INVENTOR.*
Willis G. Worcester
BY

Horace B. Van Valkenburgh
*ATTORNEY*

Dec. 21, 1965     W. G. WORCESTER     3,225,269
ELECTRICAL APPARATUS

Original Filed Jan. 3, 1955                    5 Sheets-Sheet 2

INVENTOR.
Willis G. Worcester
BY
Horace B. Van Valkenburgh
ATTORNEY

Dec. 21, 1965  W. G. WORCESTER  3,225,269
ELECTRICAL APPARATUS
Original Filed Jan. 3, 1955
5 Sheets-Sheet 3
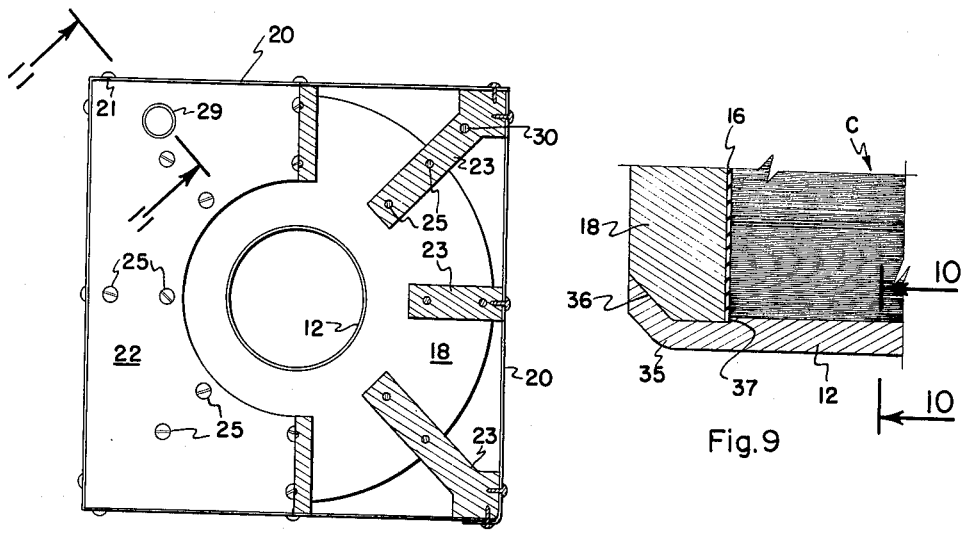
Fig. 8
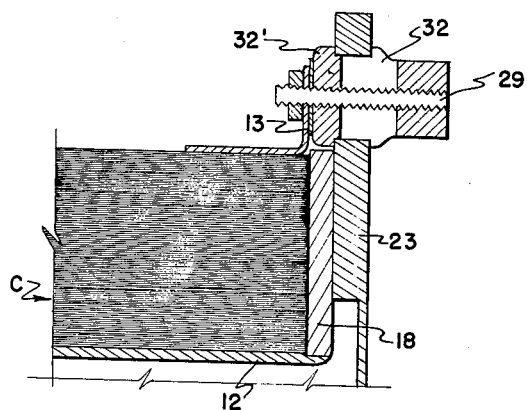
Fig. 9
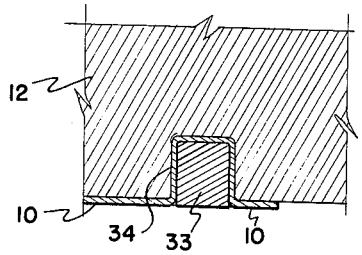
Fig. 10
Fig. 11
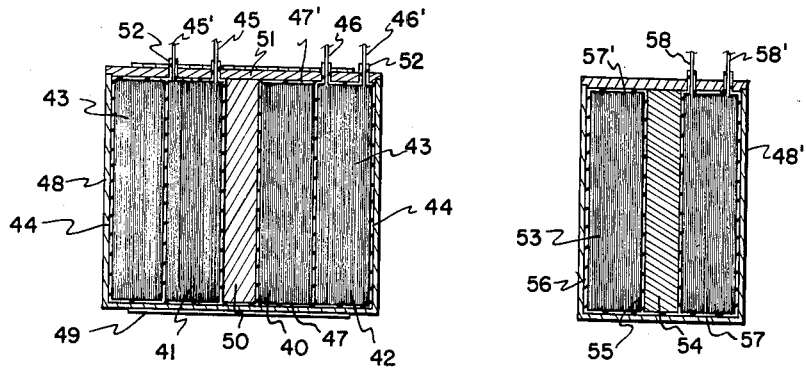
Fig. 12
Fig. 13
INVENTOR.
Willis G. Worcester
BY
Horace B. Van Valkenburgh
ATTORNEY Dec. 21, 1965 W. G. WORCESTER 3,225,269
ELECTRICAL APPARATUS Original Filed Jan. 3, 1955

INVENTOR.
Willis G. Worcester
BY
Horace B. Van Valkenburgh
ATTORNEY

United States Patent Office 3,225,269
Patented Dec. 21, 1965

3,225,269
ELECTRICAL APPARATUS
Willis G. Worcester, 748 10th St., Boulder, Colo.
Original application Jan. 3, 1955, Ser. No. 479,315. Divided and this application Oct. 4, 1961, Ser. No. 144,007
6 Claims. (Cl. 317—158)

This application is a division of my copending application Serial No. 479,315, filed Jan. 3, 1955, now abandoned.

This invention relates to electrical apparatus and more particularly to the various types of electrical apparatus, such as plunger solenoids, traveling wave tubes, transformers, motors, generators, relays and others, in which a magnetic field is produced by a coil.

Coils for producing a magnetic field have conventionally been made by winding concentric layers of wire upon a core or support, the wire necessarily being insulated so that an electric current may be passed through the coil to produce a magnetic field. Conventional coils wound with copper wire are unduly heavy and in many applications where weight is a factor, limitations upon the use of such coils are considerable.

Wire wound electromagnets, in addition to the substantially high weight factor, are also subject to limitations in operation due to the tendency to become overheated, particularly the wires disposed centrally in the coil. While insulation of the wires is a necessity for electrical purposes, this same insulation acts as a barrier for the transfer of heat, so that the central wires particularly tend to become overheated, resulting in a breakdown of the insulation and a failure of the coil. This tendency increases with an increase in the number of turns and the size of the coil.

Among the objects of the present invention are to provide novel electrical apparatus including a coil, particularly useful as an electromagnet; to provide such electrical apparatus which includes a coil which may be provided with any desired number of turns, yet heat is readily transferred from the interior of the coil so that the coil has less tendency to overheat; to provide a novel elongated solenoid which includes such a coil; to provide a novel traveling wave tube solenoid, backward wave oscillator tube solenoid, a novel transformer, a novel choke coil, a novel plunger solenoid, a novel relay, a novel motor or generator, a novel amplifier, a novel humidity sensitive device, and the like, each of which includes such a coil; to provide such electrical apparatus which is efficient and effective in operation; and to provide a novel electromagnet which includes such a coil and which weighs considerably less than a wire wound coil of the same capacity.

Additional objects and the novel features of this invention will become apparent from the description which follows, taken in connection with the accompanying drawings, in which:

FIG. 8 is an end view of the traveling wave tube solenoid of FIG. 6, partially in section taken along line 8—8 of FIG. 7;

FIG. 9 is a considerably enlarged, fragmentary longitudinal section taken at the inner edge of the coil of the traveling wave tube solenoid of FIG. 6, as at the position of line 9—9 of FIG. 7;

FIG. 10 is a fragmentary cross section, taken along line 10—10 of FIG. 9;

FIG. 11 is a slightly enlarged, fragmentary longitudinal section taken obliquely through a binding post, as along line 11—11 of FIG. 8;

FIG. 12 is a longitudinal section of a transformer, constructed in accordance with this invention;

FIG. 13 is a longitudinal section of a choke coil, constructed in accordance with this invention;

Figure 1:
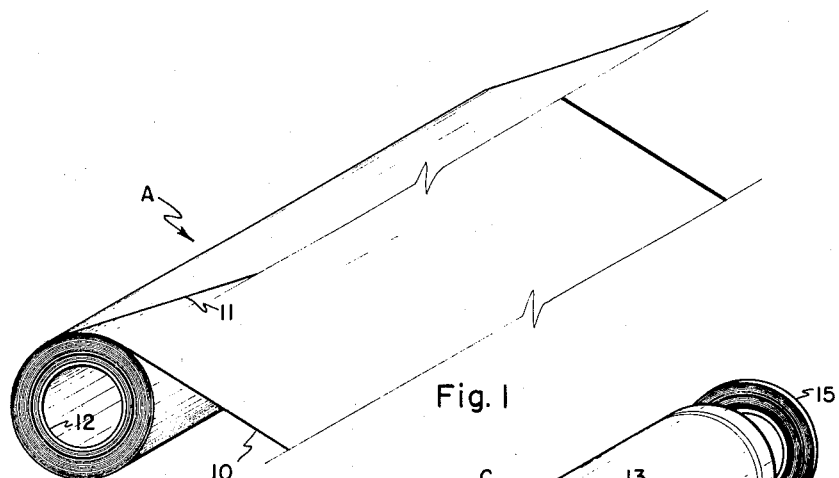
FIG. 1 is a perspective view illustrating the manner in which a wound assembly may be produced, the completed assembly being used in making one or a plurality of coils for electrical apparatus constructed in accordance with this invention.

A magnetic coil for electrical apparatus constructed in accordance with this invention may be formed from a desired length of electrically conductive metal foil 10 of FIGS. 1-5, wound around a center in layers and interspaced with layers of a relatively thin insulating sheet 11, such as a sheet of plastic or other suitable material. The metal foil may be aluminum or an aluminum alloy, although any other electrically conductive metal may be utilized, the lighter metals and alloys being preferred. The insulating layers may be formed from a plastic, such as "Mylar" plastic film, i.e., a resin in film form corresponding to "Dacron," a polyester of an aromatic dibasic acid and ethylene glycol, although any other suitable type of plastic or a sheet of other material, such as paper, treated or untreated, or varnish or other coating on the foil, may be utilized. In addition, an oxide coating or film on one or both sides of the foil 10, such as produced by anodizing or the like, may be utilized as the insulating layers. Thus, the insulating layers may be provided on the foil prior to winding or interspaced therewith during winding. The thickness of the foil and insulation will depend upon the voltage to be impressed on the coil and also the voltage between turns; thus, the insulation may be on the order of ¼ mil, i.e., 0.00025 inch thick, while the metal foil may be on the order of ¼ mil to 1¾ mils thick, i.e., 0.00025 to 0.00175 inch, or thicker if desired. Of course, the thickness of the metal foil and the insulation may be varied, in accordance with the voltage, resistance, ampere-turns and other factors which affect the intensity and strength of the magnetic field to be produced. The insulation and metal foil may be wound simultaneously on a tube 12 which provides the center for the coil, or on a thin tube or an insulating layer which remains but may be supported by a mandrel for winding. The tube 12, as the center for the coil, may be made of electircally conducting or non-conducting material; if the former, it may be made of relatively light metal, such as aluminum or aluminum alloy, in which case the first turn of the metal foil may conveniently be attached to the central tube in such a way that the tube may be utilized as an electrical conductor for one end of the foil. The foil or/and the insulation may be a strip having any practical dimension, both as to width and length, such as from a few inches to several yards wide, while a length of insulation and foil from a few feet to several hundred yards may be utilized in one coil or a coil assembly A of FIGS. 1 and 2, which is utilized in forming a plurality of coils C of FIG. 2. In addition, the mandrel or tube about which the coil assembly is wound need not be circular in cross section, but may have any other desired cross sectional shape, such as rectangular, square, oval, polygonal with any desired number of sides and length of sides, both straight and tapering from end to end, conical, or other shape.

The winding of the coil assembly A is illustrated in FIG. 1, in which a layer of thin aluminum foil 10 and a thin plastic insulating sheet 11 is being wound about the thin aluminum tube 12, which may be rotated in any suitable manner. The aluminum foil 10 and insulation 11 may be fed to the winding operation from sheets or rolls, while the insulation 11 is preferably wider than the aluminum foil 10 so that the ends of the insulation overlap the foil. Thus, if the coil assembly A is utilized as a single coil, or either end thereof is utilized as the end of a coil, the insulation will insulate the foil at the ends. As the desired length or the end of the foil strip is reached, an electrically conductive tab 13, or series of tabs, may be attached to the foil strip 10 at a desired number of points determined by the number of individual coils to be made from coil assembly A. Foil strip 10 may then be cut transversely and several more turns of the insulating strip 11 wound on, if the coil must be insulated from the case, while the tabs 13, if extending longitudinal from the outer ends of the foil strip 10, preferably have sufficient length that they will extend around between the additional insulating layers. Or, if desired, the outer layer may be foil, held in position by one or more bands of tape. The tabs 13 may be attached to the end of the foil strip 11 prior to or after severing, as by soldering, pressure welding, or merely by sufficient pressure that a good electrical contact is obtained. Tabs 13 are preferably thicker than the foil 11, to enable connections to be soldered or attached thereto without danger of breakage. The outside of the coil assembly may be taped, as adjacent each end, with one or more bands of tape 14, such as a fibreglass cloth impregnated with an epoxy resin, a tape formed of fibreglass and mica, a "scotch" type tape formed of fibreglass and silicones, or tape formed of other suitable materials. The coil may then be impregnated under vacuum with a suitable bonding material, such as a resin of the so-called polyester type, i.e., a polymer formed from the reaction product of maleic anhydride, diglycol and styrene, while if higher temperatures are to be encountered a silicone rubber, such as a polymer formed from dimethylchlorosilane, may be utilized. If desired, the bonding agent may be applied during winding. However, the bonding agent used should permit curing without giving off any solvent.

Figure 2:
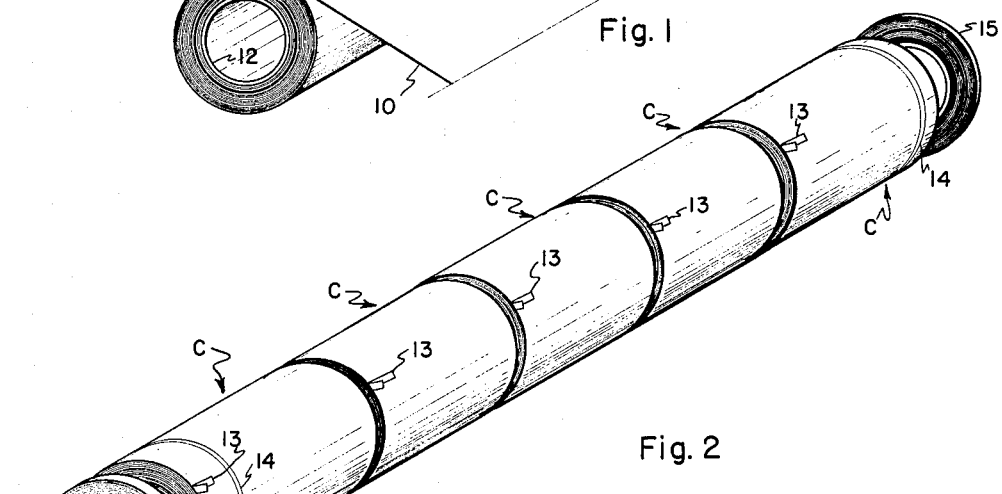
FIG. 2 is a perspective view of the wound assembly of FIG. 1, when completed and cut into sections for making a plurality of coils.

The coil assembly A, if longer than the length of the coil to be made, may be cut into lengths, such as by sawing, machining or other severing operations, to produce a series of coils, such as coils C of FIG. 2, with the ends 15 and 15' of the coil assembly remaining. Preferably, the ends 15 and 15' are relatively narrow, to minimize loss due to discarding the ends, when not used. Although the cuts between the coils C are illustrated in FIG. 2 as being perpendicular to the axis of the coil assembly, it will be understood that the cuts need not be perpendicular, but may extend at an angle thereto. Also, the cuts may be arcuate or have any other desired form of irregularity or curvature. As will be evident, the foil strip 10 is continuous from the inside to the outisde so that the end of each coil C may be shaped in any desired manner. Furthermore, as indicated previously, the tube 12 need not be circular in cross section, but may have any other desired shape.

Figure 3:
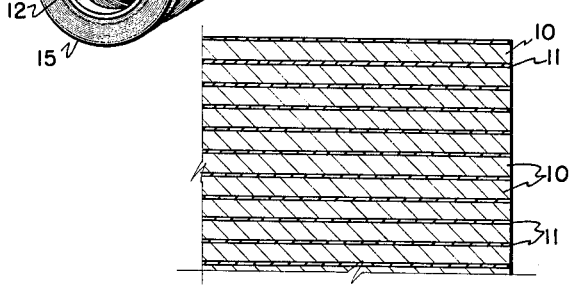
FIG. 3 is a considerably enlarged, fragmentary radial section, taken at the end of one of the coils of FIG. 2, subsequent to cutting or machining.
Figure 4:
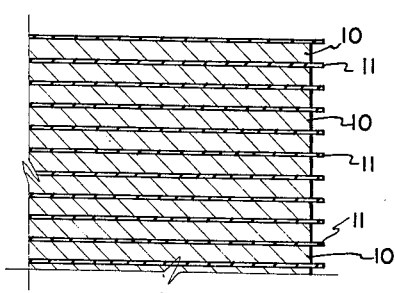
FIG. 4 is a similar considerably enlarged, fragmentary radial section, exemplifying the effect of etching.

After the coil assembly has been cut into a plurality of coils, or one or both ends of the coil trimmed if the final coil is to have substantially the same length as the coil assembly, the severed ends of the coils will appear somewhat as shown in FIG. 3, depending, of course, upon the type of severing operation utilized. When the cut is made with a sharp machine tool, as on a lathe or similar type of equipment, the severed ends of the coils will be relatively smooth, while if a saw or similar type of cutting tool normally productive of a comparatively rough cut is utilized, there may be burrs and the like on the end surface, or the ends of some foil layers may be deformed slightly in one direction or the other. In FIG. 3, the thickness of the foil layers 10 and the insulating layers 11 are shown as proportional to 1¾ mils for the foil layers 10 and ¼ mil for the insulating layers 11.

After the coils C are cut from the coil assembly, the cut end of each coil may be etched, as in a 10% nitric acid solution for aluminum foil, although other etching solutions may be utilized, or electro-polishing operations may be utilized. Etching or a similar operation is continued long enough to remove material at the ends of the foil layers for a sufficient distance back between the insulating layers, such as equal to two or more times the thickness of the insulating layers. Thus, in FIG. 4, which exemplifies the end of a coil after etching, the aluminum foil 10 may be removed back from the ends of the insulating layers 11 for a distance of approximately 1 mil, i.e., four times the thickness of the insulating layers of ¼ mil. The distance which the aluminum foil layers is etched back will depend, of course, upon the relative thickness of the foil layers 10 and the insulating layers 11, as well as the conditions of use, including the voltage to be applied to the coil and the expected voltage between turns. Thus, the amount which the foil layers are to be etched may be varied considerably.

Figure 5:
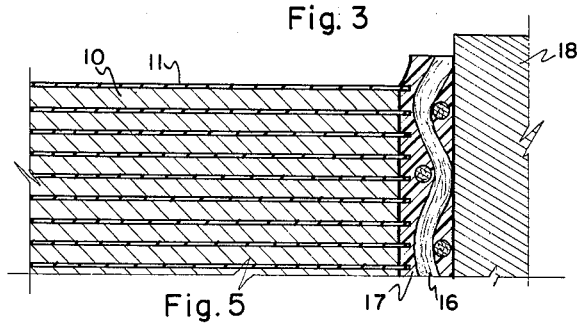
FIG. 5 is a similar fragmentary, considerably enlarged radial section, taken at the end of a coil which has been insulated and also mounted adjacent or bonded to a heat dissipating plate, which may also act to increase the intensity of the magnetic field at the end of the coil.
Figure 6:
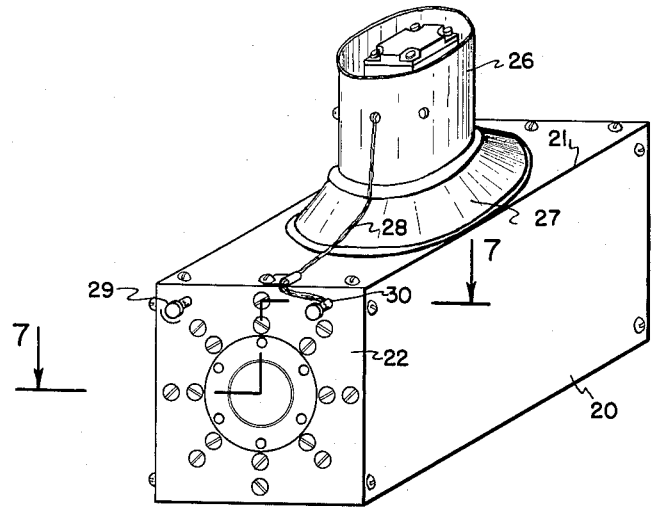
FIG. 6 is a perspective view of a traveling wave tube solenoid, constructed in accordance with this invention.
Figure 7:
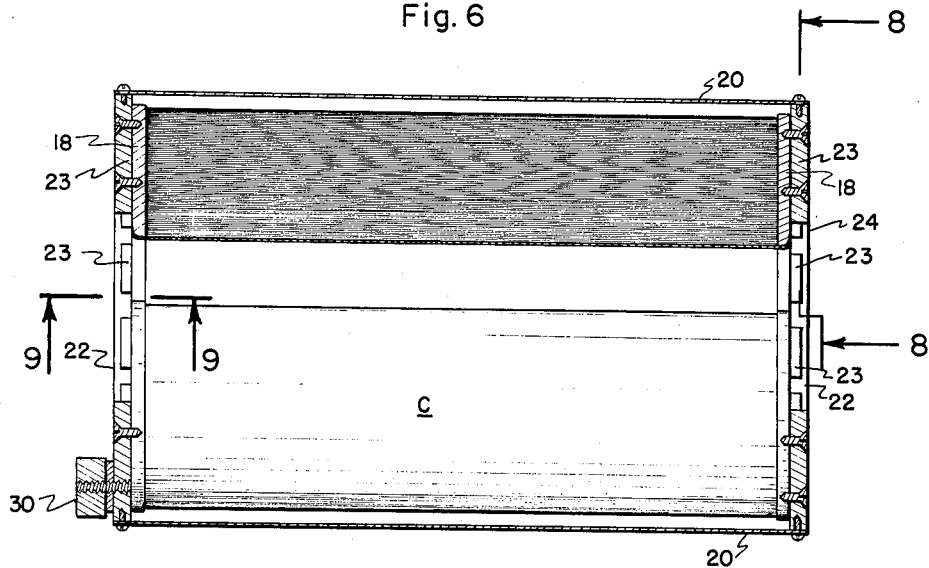
FIG. 7 is a horizontal longitudinal, offset section taken along line 7—7 of FIG. 6.

In further accordance with this invention, as illustrated in FIG. 5, the etched end of each coil may be bonded to a layer 16 of electrically insulating material, such as a fibreglass cloth, which has a suitable thickness, being exemplified in FIG. 5 as having a thickness of approximately 4 mils, which while appearing comparatively large in FIG. 5 because of the scale used, is actually a very small distance. The insulation 16, when fibreglass cloth or the like, is preferably impregnated with a suitable insulating plastic or resin, which may also extend into the spaces from which the aluminum foil has been etched away. A convenient method of attaching the insulation 16 to the end of the coil, when the insulation is fibreglass cloth or the like, is to simultaneously apply, as by brush, a layer of insulating resin 17 which may be an "Epon" resin, i.e., an epoxy araldite, or polymer of the reaction of chlorinated ethylene oxide with a phenol, which hardens at room temperatures without giving off vapours. At the same time, or later, the impregnated fibreglass cloth 16 may also be bonded to a heat conducting plate 18, conveniently formed of mild steel to increase the strength of the magnetic field at the end of the coil. Plate 18, in the assembly on which FIG. 5 is based, is about 3/16 inch thick, although other thicknesses may be utilized. Since the distance between the ends of the foil layers 10 and the heat conducting plate 18, is relatively small, such as 4 to 5 mils, i.e., 0.0004 to 0.0005 inch, it will be evident that a considerable amount of heat can be conducted between the ends of the foil layers and the heat conducting plates. As will also be evident, heat is conducted principally through the foil layers longitudinally thereof, i.e., from the center to each end, since the insulating layer 11 will tend to reduce considerably the amount of heat transmitted radially through the coil. For example, in the case of one coil constructed in accordance with this invention, it was determined that approximately 90% of the heat produced in the foil layers was conducted to the ends of the coil, while only 10% was conducted radially through the sides of the coil. Since in a wire wound coil, each turn of wire is covered with a layer of insulation, it is evident that heat generated in the interior of the coil has considerable difficulty escaping, either longitudinally or radially of the coil. Thus, such coils tend to become overheated and fail. However, coils constructed in accordance with this invention have been operated within a space having a temperature of 180° C. without failure, particularly of the layers of insulation toward the inside at the center.

A coil produced in the manner just described may be utilized in a traveling wave tube solenoid, such as illustrated in FIGS. 6–11. The coil C may be enclosed within a box formed by a thin metal sheet 20, such as aluminum and formed to a suitable shape, such as rectangular and overlapped or otherwise suitably joined at an edge 21, to form the sides, top and bottom of the box, sheet 20 being attached to end plates 22 by screws or in any other suitable manner. End plates 22 are cast or machined and conveniently provided on the inside with attached or integral, radially extending ribs 23, as in FIGS. 7 and 8, which provide space for the movement of air around the ends of the coil to a central aperture 24 through which heated air escapes. In addition, heat conducting plates 18 may be attached to end plates 22 by screws 25 extending through ribs 23. Air may be blown into the box from the top by a fan driven by a motor 26, the fan rotating within a bell 27 mounted over a circular aperture in the top of the box, as in FIG. 6. As will be evident, the fan blows air over the center of the coil and this air passes to each end of the coil box, for passage through the spaces between ribs 23 and discharge centrally at each end of the box. Heat generated in the center of the coil will flow longitudinally in each direction along each of the layers of foil 10 and thence to the heat conducting plate 18, from which it is picked up by the circulating air and discharged to the outside. For some installations, of course, the normal dissipation of heat from a heat conducting plate at each end of the coil will be sufficient so that no additional air circulation is necessary. The fan motor 26 conveniently operates on the same voltage as applied to the coil, as through leads 28, which may be connected to binding posts 29 and 30 to which the leads for coil C may also be connected. The heat conducting plate 18 may be made of mild steel and annular in shape, while the binding post 30 may be connected to the end plate 20, as at one of the ribs 23, as in FIG. 8. As in FIG. 11, the rear end of binding post 29 may be connected to a tab 13 with binding post 29 insulated from end plate 22 by a bushing, such as having two halves 32 and 32' for easier installation.

The first layer of foil is conveniently connected to the tube 12, as in FIG. 10, by a rectangular rod 33, such as a square wire, pressed with the foil into a slot 34 in tube 12. Wire 33 need not be pressed into the slot when first placed into position, since the pressure of subsequent layers of foil, as they are wound on, will press wire 33 into place. It will be understood, of course, that the scale of FIG. 10 is such as a square wire, pressed with the foil into a slot 34 in tube 12. Wire 33 need not be pressed into the slot when first placed into position, since the pressure of subsequent layers of foil, as they are wound on, will press wire 33 into place. It will be understood, of course, that the scale of FIG. 10 is such that the rod 33 and slot 34 appear to be much larger than they actually are, since in the embodiment of this invention, upon which FIG. 10 is based, the thickness of tube 12 is 1/16 in. and rod 32 is a square aluminum wire approximately 1/32 in. on each side. Thus, the slot 34 may be milled or cut to a depth of greater than the thickness of wire 33 by approximately the thickness of foil 10, with the width greater than the width of wire 33 by approximately twice the thickness of foil 10. Of course, the slot 34 need not be machined with complete accuracy, since the rod 33 may be made of sufficiently deformable metal that a slight variation in the desired dimensions of slot 34 will be automatically compensated for when the rod 33 is wedged into the slot. However, it will be evident that the wedging action of the rod against the foil 10 will hold the inner end of the foil strip securely in place and will also produce a good electrical contact between the foil 10 and the tube 12. It will be understood, of course, that the rod 33 and the slot 34 of FIG. 10 extend for the complete length of tube 12 when the coil assembly A of FIGS. 1 and 2 is being made, the rod 33 being severed into lengths corresponding to the length of the separate coils C when the coil assembly A is cut apart.

When the coils C are cut from the coil assembly A, the cuts may be sufficiently wide, such as 3/8 inch, and these cuts taken down only through the outer edge of the tube 12, so that the tube 12 may then be severed at the center of the cut between the coils to provide an extending end 35 of the tube 12 at the end of each of the coils C, as in FIG. 9. Such extending end may be rolled up against a bevel 36 provided around the outer edge of the central aperture in annular plate 18, to attach the plate 18 more securely to the coil and particularly to tube 12. Also, when the comparatively wide cut between the coils C is made, the tube 12 may be machined down, such as for a distance of approximately 0.0025 in. to provide a shoulder 37, so that the insulation 16 will extend slightly below the first turn of the foil 10, thus insuring adequate insulation between the coil and plate 18 at the inside edge of the coil. The rolled edge of tube 12 against bevel 36 also provides a good electrical contact, so that the electrical lead for the inside turn of coil C may merely be attached to end plate 22 which is attached to plate 18, as described previously.

In a transformer constructed in accordance with this invention, as illustrated in FIG. 12, an insulating layer 40 may be placed upon a mandrel and a primary coil 41 may be wound thereon, the thickness of the aluminum foil layers and the number of turns being such that the desired alternating magnetic field will be produced. The mandrel for insulation 48 may be cylindrical, or may be oval or any other desired shape in cross section, while a thin tube may be placed over the insulation, to which the first turn of the coil may be connected. Of course, the thin foil wound to make the coil 41 is interspaced with layers of insulating material, such as previously described, or provided with an insulating layer on its surface prior to winding. An insulating layer 42, such as several turns of the insulating layer or tape or the like as described previously, may be placed around the primary coil 41, after which the foil layers of a secondary coil 43 may be wound on and when the desired number of turns of the secondary coil have been wound on, an outside insulating layer 44, conveniently similar to layer 42, may be applied. It will be understood, of course, that additional secondary windings or coils may be wound on the primary coil, or the primary coil layers interspaced with one or more secondary coil layers, while a coil assembly in a manner similar to the coil assembly A of FIGS. 1 and 2, may be made and then cut apart at desired points for production of a plurality of coils, in a manner similar to that illustrated in FIG. 2. The mandrel is removed after the separate coils have been cut apart, and the ends of the coils may then be etched. Lead tabs 45 and 45' for the primary coil and lead tabs 46 and 46' for the secondary coil may be inserted in the coils, in any suitable manner which will produce a good electrical contact with the inner and outer turns of the respective coils. The lead tabs may be attached to the respective foil layers, if installed during winding, by pressure bonding, by spot welding, by an ultrasonic soldering gun and conventional solder, or in any other suitable manner. If desired, the coil assembly may be equal in length to two transformer coils only, so that the primary and secondary leads may be attached to the inner and outer turns of the primary coil 41 and secondary coil 43, as these turns are reached during winding at each end of the coil assembly. In this instance, the ends of the coil assembly are not disturbed, since the assembly is cut apart at the center only and the cut ends of each transformer coil so produced etched. In either event, the etched ends of the coils are then provided with an insulating layer 47 or also 47', such as of fibreglass cloth, bonded to the machined and etched end of the transformer coil by an epoxy resin or other suitable material, which also fills the spaces between the insulating layers exposed by etching, as described previously.

The transformer coil may be placed in a case having a laminated steel body 48 and provided at the bottom, if desired, with additional laminations 49. A laminated steel core 50 may be inserted in the space within insulating layer 40, formerly occupied by the mandrel when the coils are wound, while a laminated steel top 51 may be attached to the body 48 in any suitable manner. In addition, suitable insulation 52 is provided for each of the tabs 45, 45', 46 and 46' at the points where they pass through the laminated top 51 of the transformer case. When the end of the transformer coil from which the lead tabs extend comprises the end of the coil assembly and is therefore not machined, the overlap of the insulating layers, when used, is preferably controlled so that it will correspond generally to the overlap produced by etching.

A choke coil constructed in accordance with this invention and illustrated in FIG. 13, may be similar to the transformer of FIG. 12, except that only one coil 53 is utilized, surrounding a laminated core 54 with a layer of insulation 55 between the two, as well as a layer of insulation 56 around coil 53. The ends of the coil 53 are provided with insulating layers 57 and 57', respectively, conveniently formed as before. Also, leads 58 and 58' may be connected to the inner and outer turns, respectively, of coil 53, which may be placed in a laminated steel body 48' closed by a laminated steel top 51', while insulation 52' is preferably provided for the lead tabs at the point at which they pass through the top 51'. Also, the coil may be bonded to the bottom 49' of body 48' and to the top 51' when the insulating layers 57 and 57', respectively, are applied. As before, the choke coils 53 may be made singly or in parts, or a plurality thereof cut from the same coil assembly. The shape of core 54 of the choke coil of FIG. 13, similarly to the core 50 of the transformer of FIG. 12, need not be circular in cross section, but may be any other desired shape, such as a rectangle with rounded corners, oval and the like. As will be evident, the shape of the body and/or top of the case of either the transformer of FIG. 12 or the choke coil of FIG. 13 may be varied and the extent of the laminations varied in accordance with the type of magnetic field and the extent thereof desired. The body and top also may be solid rather than laminated, if desired, although a laminated body and top may provide a lower eddy current loss.

Figure 14:
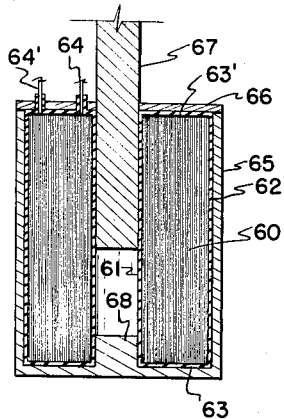
FIG. 14 is a longitudinal section of a solenoid, constructed in accordance with this invention.
Figure 16:
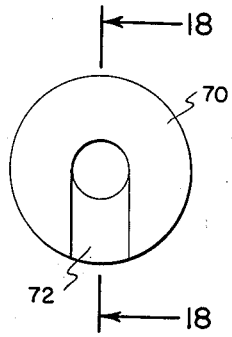
FIG. 16 is a top plan view of the coil of the relay of FIG. 15.
Figure 17:
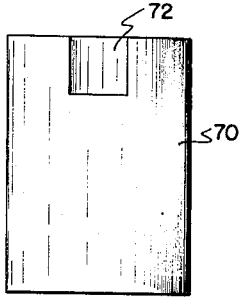
FIG. 17 is a front elevation of the coil of FIG. 16.
Figure 18:
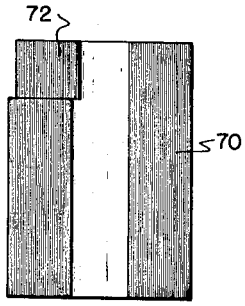
FIG. 18 is a vertical section, taken along line 18—18 of FIG. 16.

A solenoid, constructed in accordance with this invention and illustrated in FIG. 14, may comprise a coil 60 wound about a layer 61 of insulation on a mandrel having any desired shape, as indicated previously. The coil 60 preferably comprises alternate layers of thin aluminum foil and insulation, each of a thickness determined by the maximum voltage, voltage between turns, and other factors which determine the desired characteristics of the coil. After the coil 60 is wound, an outer insulating layer 62 may be applied thereto, while after the ends of the coil have been etched, insulating layers 63 and 63' may be applied to the ends, such as comprising fibreglass cloth impregnated with a suitable resin which will also bond the cloth to the ends of the coil. As before, lead tabs 64 and 64' may be mounted while winding or after winding inserted in contact with the inner and outer turns, respectively, while the coil may be placed in a laminated steel body 65 provided with a laminated steel top 66 having a central aperture adapted to accommodate movement of a movable laminated core 67. Conveniently, additional laminations 68 may extend upwardly from the bottom of the body 65 into the central hole in the coil 60, to increase the uniformity of the magnetic field, when the core or plunger 67 need not be moved clear to the bottom of the coil during operation. Also as before, the lead tabs 64 and 64' may be insulated at the point at which they pass through the top 66. When the end insulating layers 63 and 63' are applied, the coil may be simultaneously assembled with the body 65 and top 66 so that the resin which is utilized in the layers 63 and 63' will bond the coil to the bottom of the body 65 and to the top 66, respectively.

A contact relay, constructed in accordance with this invention and illustrated in FIGS. 15–18, may comprise a coil 70 which is wound from thin aluminum foil and interspaced layers of insulation, as before, about a mandrel which supports a central insulating layer 71, while each coil may be wound singly or two or more cut from a coil assembly, as previously described. However, prior to etching, a slot 72 is machined in one end of the coil, from the outside to the center, slot 72 conveniently having any desired width, such as equal to the diameter of the central hole in the coil, as in FIG. 16. The sides of slot 72 are preferably etched and insulated in the same manner as the ends of the coil. As in FIG. 15, slot 72 accommodates a bar 73 formed of magnetic material and pivoted at its outer end on the wall of a body 65', withing which the coil and its laminated core 74 are housed. Bar 73 supports an arm 75 provided at its extending end with a single contact or a double contact, as shown, or a multiplicity of contacts, adapted to selectively engage one or more contacts 76 supported by a bracket 77 depending from the top 66' of the housing or supported in any other suitable manner and from which suitable lead wires extend to the electrical device or devices to be controlled. As will be evident, slot 72 provides sufficient space for installation of the bar 73 and the parts associated therewith, so that the top 66' of the housing may be placed down against the top of the coil 70, with an insulating layer 78 therebetween. However, tests have indicated that the slot 72 does not materially affect the magnetic field produced, nor does a hole bored radially through the coil, either completely through or only to the center. As before, an insulating layer 78' is provided at the bottom of the coil, with the layers 78 and 78' preferably bonded to the top and bottom of the housing, respectively, while an insulating layer 62' is placed around the coil to insulate the outer turn of the foil winding from the sides of the housing body 65'. Also, an insulating layer 79'' may be placed on the sides and bottom of slot 72.

Figure 15:
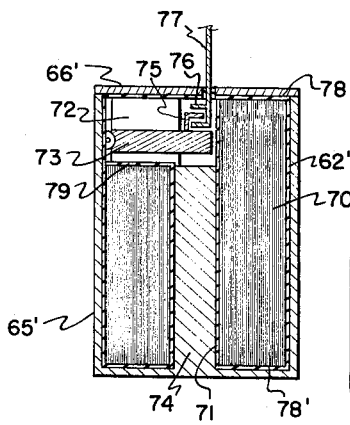
FIG. 15 is a longitudinal section of a contact relay, constructed in accordance with this invention.

In each of the transformers of FIG. 12, the choke coil of FIG. 13, the solenoid of FIG. 14 and the relay of FIG. 15, it will be evident that heat flows longitudinally along each of the foil layers to each end of the respective coil, and this heat will have little difficulty in flowing across the relatively thin insulating layers provided at the ends of the coils. Thus, the heat is readily dissipated from the ends of the housing which enclose the coils. If desired, the relay of FIG. 15 may include a coil which does not have a slot at one end thereof, with the bar 73 and associated parts mounted in a space within the housing above the coil, but in this instance, a heat conducting plate may be provided at the upper end of the coil to conduct heat therefrom more readily.

A motor or generator, constructed in accordance with this invention and illustrated in FIGS. 19-22, may include an armature 80 mounted on a shaft 81 supported in bearings 82, mounted on the ends 83 of a housing having an annular side wall 84. For operation on direct current or for use as a direct current or alternating current generator, suitable brushes and lead wires to the armature 80 may be provided, the same being conventional and therefore not shown, although a space in which the same may be installed is shown adjacent one housing end 83.

Figures 19, 20:
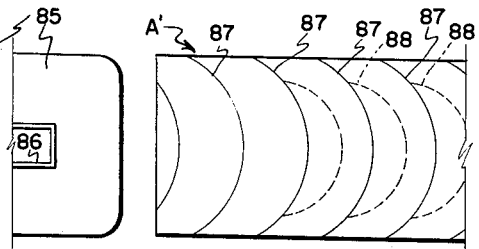
FIG. 19 is an end elevation of a coil assembly which is adapted to be utilized in producing a plurality of coils for a motor or generator.
FIG. 20 is a fragmentary side elevation of the coil assembly of FIG. 19, with dotted lines indicating the manner of cutting the coil assembly into a plurality of such coils.
Figure 22:
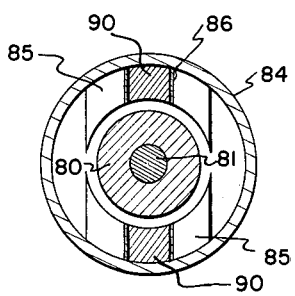
FIG. 22 is a cross section, taken along line 22—22 of FIG. 21.
Figure 21:
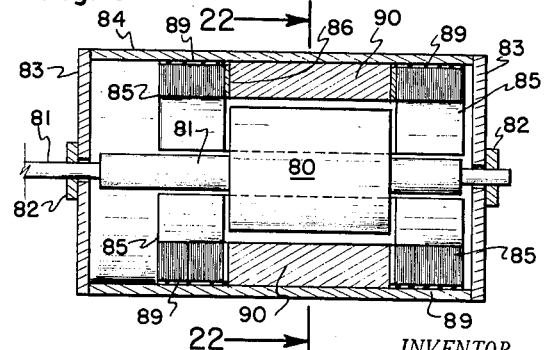
FIG. 21 is a longitudinal section of a motor or generator constructed in accordance with this invention and including coils produced from the coil assembly of FIGS. 19 and 20.

In accordance with this invention, each of the field coils 85 is formed to correspond in curvature at one end to the side wall 84 of the housing and at the opposite end substantially or generally to the curvature of the armature 80, the field coils 85 being substantially rectangular in shape and comprising interspaced layers of aluminum foil and insulation wound about a relatively thin aluminum tube 86, of FIG. 19, which corresponds in shape to the center of the coil, such as rectangular. The width of aluminum foil and insulation which is wound about the tube 86, which may be supported by a mandrel for winding, if desired, may conveniently be several times the desired thickness of the field coils 85, so as to provide when winding a coil assembly A' of FIG. 20, in which the layers of foil and insulation extend longitudinally of the coil assembly, i.e., parallel to the inner tube 86. After lead tabs have been attached to the outer turns of the foil windings at selected positions, in a manner similar to that illustrated in FIG. 2, and an outer layer of insulation has been wound about the coil assembly A', a series of coils 85 may be cut from the coil assembly A', as by band sawing or otherwise suitably cutting along the lines 87 of FIG. 20. As will be evident, a series of spaced cuts 87 will produce coils whose ends have the same radius of curvature, but the coils may be cut so that one end has a smaller radius of curvature to correspond more exactly to the outer radius of armature 80, the latter being accomplished by cutting one end along dotted line 88 and the other end along a spaced dotted line 87. Of course, when each end of the coils is cut along the same radius, the only waste is the material removed by cutting, while when the ends are cut along different radii, some material between each coil will be waste, such as between a line 87 and an adjacent line 88. Nevertheless, by constructing coils in this manner, a larger coil can be placed in a smaller space within the motor housing, while such a coil also tends to transfer heat more readily from the center to the side wall 84 of the housing, from whence it may be dissipated. It is to be noted, of course, that a relatively thin insulating layer 89, preferably bonded both to the etched end of the coil and the inside of the housing wall 84, provides sufficient insulation for electrical purposes, but does not seriously impede the conducion of heat from the ends of the foil layers to the housing. The opposite end of each coil may, of course, be similarly insulated. A steel core 90, laminated if desired, may be placed within each coil 85, to strengthen the magnetic field and render it more uniform.

Figure 23:
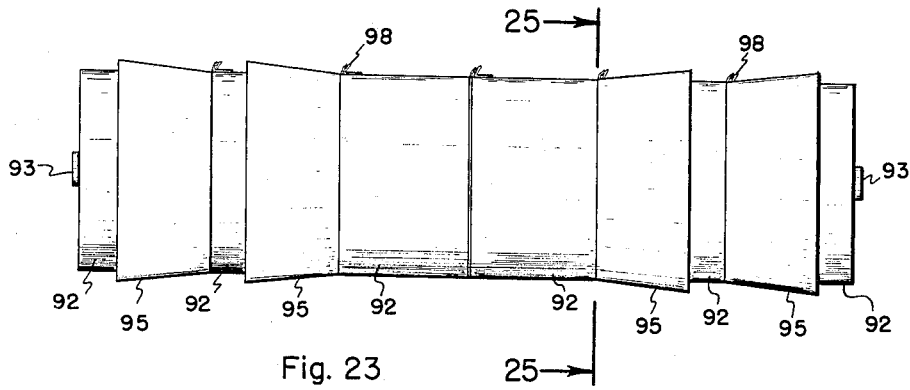
FIG. 23 is a side elevation of a sectionalized coil, constructed in accordance with this invention and particularly adapted to be operated at relatively high voltages.
Figure 24:
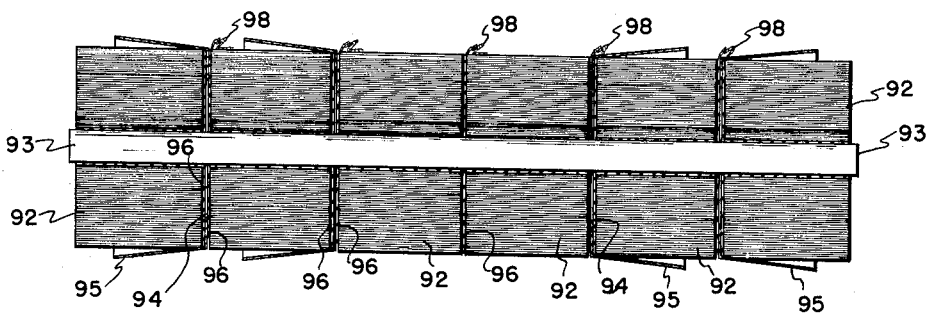
FIG. 24 is a longitudinal section of the sectionalized coil of FIG. 23.
Figure 27:
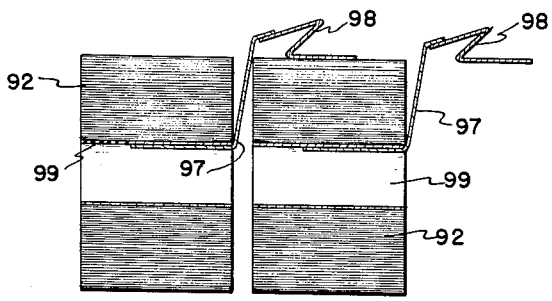
FIG. 27 is a fragmentary longitudinal section, similar to FIG. 24 but showing only two adjacent coil sections in spaced apart relationship, to illustrate the manner in which the lead tabs of the two adjacent coils are connected.
Figure 26:
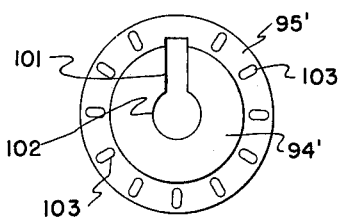
FIG. 26 is a vertical section similar to FIG. 25, illustrating an alternative heat dissipating plate.

An elongated coil constructed in accordance with this invention, particularly useful for operation at relatively high voltages and illustrated in FIGS. 23-26, may comprise a series of coils 92 mounted coaxially, as on a supporting tube 93, with each coil 92 being made in the manner previously described, i.e., from a coil assembly which is formed by winding relatively thin aluminum foil, or the like, as on a central tube or mandrel, the foil being provided with insulation or a sheet of insulation interspaced with the foil layers. While six coils are shown in FIGS. 23 and 24, it will be understood that any desired number of coil sections may be used and also that the coil sections may differ in length, such as the end coils being shorter than the remainder of the coils, so that the ampere turns per unit length of the end coils will be greater and, with the coils in series, the intensity of the magnetic field produced by the end coils will be greater than otherwise. This increases the strength of the magnetic field at the ends of the sectionalized coil, thereby providing a more uniform magnetic field along the entire length of the sectionalized coil. Since heat is transmitted primarily longitudinally to the ends of the coils, in the event that a relatively high voltage and a comparatively large amount of power is utilized, there would be a tendency for the center of the coil to become overheated in the event that a relatively long single coil were utilized. However, by sectionalizing the entire coil, heat may be transferred from at least one end of each of the coils 92, as by an annular heat conducting plate 94 having an outwardly flaring flange 95 extending from the peripheral edge thereof, each plate 94 preferably being bonded to the insulating layer 96 at the end of each adjacent coil. The flange 95 is preferably made integral with the plate 94 so that the heat transmitted to each plate from the end of a coil 92 will be dissipated, as by transfer to a stream of air blown along the outside of the sectionalized coil. The coils 92 may be connected in series, as by an inner tab 97 of one coil connected to an outer tab 98 of the next adjacent coil, as in FIG. 27. The coils are conveniently wound about a thin tube 99, to each of which an inner tab 97 may be connected, the inner turn of the coil foil being electrically connected to tube 99 in any suitable manner, such as that previously described. Each outer tab 98 is connected to the outer turn of the foil, such as when the coil assembly, which is later cut apart to form the individual coils, is being made. The outer tabs 98 may be attached prior to placement of the outer layer of insulating tape or the like, as previously described, while the inner tabs 97 may be connected after the individual coils have been cut apart and etched, but before the electrically insulating layers 96 are applied, such as fibreglass cloth impregnated with a suitable resin which fills the spaces between the insulating layers formed by etching and also bonds the fibreglass cloth to the ends of the coil. The thin tubes 99, of course, are sufficiently larger in diameter than the central tube 93, so that each of the coils 95 may be slipped over the central tube 93 for assembly and suitably insulated therefrom.

Figure 25:
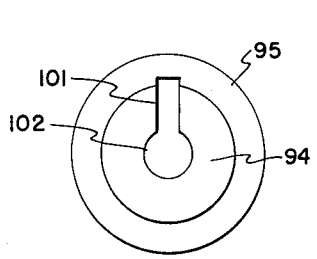
FIG. 25 is a vertical section taken along line 25—25 of FIG. 23.

In order to accommodate the inner tabs 97, each of the annular plates 94 may be provided with a radial slot 101, as in FIG. 25, which extends from a central hole 102, which accommodates tube 93, and also outwardly into flange 95 for a short distance. Or, as in FIG. 26, the outwardly flaring flange 95' of a plate 94' may be provided with a series of axially extending slits 103, or with a series of holes of any appropriate shape to permit air to be blown through the flanges, particularly when space is a factor and the clearance between the housing for the coil and the flanges is small or even non-existent. Conveniently, the plates 94 are bonded to the insulating layers 96 between the coils at the time the same are applied. Also, sufficient resin film may be placed between the coils, so that the resin will extend into the slot 101 and provide electrical insulation for the tab 97. Thus, after the coils 92 have all been assembled with plates 94 therebetween, the inner and outer tabs may be connected together at the same time, rather than each coil being connected to the adjacent coil when assembled thereto. As illustrated in FIGS. 23 and 24, there is no plate 94 between the two central coils 92, since sufficient heat will be conducted longitudinally to the opposite ends of the central coils 92. However, a heat conductive plate 94 may be placed between the two central coils 92, while a plate 94 may be disposed between the ends of each pair of adjacent coils, each plate 94 thus receiving heat transferred longitudinally in both directions from the adjacent coils.

The sectionalized coil of FIGS. 23 and 24 may be installed in a suitable housing, into which air may be blown by a fan or the heat may be carried away in any other suitable manner. In any event, at least one end of each coil 92 preferably engages a heat conducting plate 94, although the end coils 92 may be bonded to a heat transfer plate of mild steel or the like, as in the case of the traveling wave tube solenoid of FIG. 6, since such a steel heat transfer plate also tends to render the magnetic field at the ends more uniform. Nevertheless, particularly where weight is of concern, the relatively light heat transfer plates 94 or equivalent heat transfer devices, are preferable. The flanges 95 may, of course, be formed as radiating fins or projections, or as cooling tubes through which a coolant may be passed, although the forms shown are perhaps simpler to produce, and in any event, the flanges 95 should provide adequate area for heat dissipation. Also, alternate coils may be wound reversely, so that the inner ends of alternate adjacent coils may be connected together and the outer ends of the next adjacent coils may be connected together.

From the foregoing, it will be evident that the electrical apparatus of this invention fulfill to a marked degree the requirements and objects hereinbefore set forth. An electromagnetic coil used in apparatus of this invention is very light in weight, compared to a wire wound coil. For example, a traveling wave tube solenoid of this invention has been made weighing twelve pounds and has been found to be equal in performance to a copper wire wound traveling wave tube solenoid weighing forty-five pounds. In the case of a contact relay in which the contacts are mounted in a slot machined in the end of the coil, the coil can be machined or cut at the ends to any desired shape so as to save space by the positioning of certain parts, or even to place parts in positions which would be impossible with a wire wound coil, except by using a very expensive and complicated winding procedure. In addition, the milling of a slot in the end of a foil coil, for instance does not appear to affect to an appreciable degree the magnetic field produced by the coil. Thus, holes may be drilled through the coil at any desired place, as for the support or positioning of parts which are to be disposed inside the coil, or for the purpose of introducing connections to apparatus within the coil, as well as for mounting the coil.

As will be evident, in the case of motors and generators constructed in accordance with this invention, the ends of the field coils may be shaped to conform to a housing or other part with which the coils are to be associated or against which they are to be mounted, thereby avoiding complicated winding procedures which would be necessary in making wire wound coils of the same shape. Also, the foil laminations extend longitudinally toward the housing, so that heat is transmitted directly to a part which is naturally a dissipater of heat. Of course, when the motor or generator is provided with a fan for blowing air through the housing, such air also carries away heat quite effectively from the inner ends of the coils. As will also be evident, when a relatively long coil is to be made, it can be sectionalized and heat dissipating plates placed between the sections so that heat may be carried to points outside the coil from which it may be removed in a suitable manner. Such heat dissipating plates may be made of light metal, thereby minimizing the weight of the coil.

Although various types of electrical apparatus in which such coils are particularly adapted to be utilized have been illustrated and described, it will be understood that other changes and variations may be made. For instance, in a transformer, the primary and secondary coils need not be concentric, but may be disposed axially, as about a core; or, the primary and one or more secondary windings may comprise alternating relatively thin or waferlike coils, each constructed in accordance with this invention and disposed axially about a core. Such relatively flat, or what may be termed "pan-cake" type of coils, may also be utilized in other types of electrical apparatus, such as in a carcinotron traveling wave tube or in a mass spectrometer. Thus, other embodiments of this invention may exist and various additional changes made, all without departing from the spirit and scope of this invention.

What is claimed is:

1. An elongated solenoid comprising a central support; a series of coils, disposed in axial relationship along said support, the end of each coil corresponding in contour to the end of each adjacent coil and each said coil including a center, alternating layers of thin metal foil and insulation extending in spiral relation about said center and insulating material at each end of said coil; a separate electrical connection to each of an inner foil turn and an outer foil turn of each said coil; and a series of heat conducting plates, each extending radially between the ends of two adjacent coils and outwardly beyond said coils, the number of such plates being such that at least one end of at least each intermediate coil abuts one of said heat conducting plates.

2. An elongated solenoid as defined in claim 1, wherein each said heat conducting plate is provided with an outer flange.

3. An elongated solenoid as defined in claim 2, wherein said flanges extend outwardly and are provided with apertures to permit flow of air therethrough.

4. An elongated solenoid as defined in claim 1, wherein each coil is wound about a thin tube as a center with the inner turn of foil connected to said tube; wherein a tab is connected to the inside of said thin tube and extends radially outwardly along the end of said coil and between said coil and the next adjacent coil; and each said plate is provided with a slot in which one of said tabs extends.

5. An elongated solenoid as defined in claim 1, wherein the spiral layers of insulation of each said coil extend beyond the foil layers at each end and said insulating material extends into the spaces between the ends of said insulating layers.

6. An elongated solenoid comprising a series of coils, each including a center and alternating plates of thin metal foil and a strip of insulation extending in spiral relation about said center, the end of each said coil lying substantially in a plane transverse to the axis of said center and the layers of insulation extending beyond the foil layers at each end of said coil; an electrical conductor connected to an outer layer of foil of each coil; an electrical conductor connected to the inner layer of each coil and extending radially outwardly between the ends of adjacent coils for connection to the outer conductor of an adjacent coil; a heat transfer plate disposed between the abutting ends of at least one pair of adjacent coils and provided with an integral flange flaring outwardly from the peripheral edge of an adjacent coil, said plate having a slot extending into said flange to accommodate the conductor extending from the inside of a coil adjacent thereto, the number of such plates being such that at least one end of at least each intermediate coil abuts one of said heat conducting plates; a layer of insulation including resin and bonded to the end of each said coil, said resin entering the spaces between the extending ends of the layers of insulation and also bonded to said heat conducting plate where present, said resin also entering said slot in said plate and forming insulation for the conductor extending through said slot.

References Cited by the Examiner

UNITED STATES PATENTS 2,850,707  9/1958  Wroblewski et al. ---- 336—207
3,113,374  12/1963  Zack ------------- 29—155.57

JOHN F. BURNS, *Primary Examiner.*